United States Patent
Kerrick et al.

(10) Patent No.: US 12,030,185 B2
(45) Date of Patent: Jul. 9, 2024

(54) TECHNIQUES FOR CAD-INFORMED ROBOTIC ASSEMBLY

(71) Applicant: AUTODESK, INC., San Francisco, CA (US)

(72) Inventors: Heather Kerrick, Oakland, CA (US); Erin Bradner, San Francisco, CA (US); Hui Li, San Francisco, CA (US); Evan Patrick Atherton, San Carlos, CA (US); Nicholas Cote, San Francisco, CA (US)

(73) Assignee: AUTODESK, INC., San Francisco, CA (US)

( * ) Notice: Subject to any disclaimer, the term of this patent is extended or adjusted under 35 U.S.C. 154(b) by 705 days.

(21) Appl. No.: 16/667,843

(22) Filed: Oct. 29, 2019

(65) Prior Publication Data

US 2020/0147794 A1    May 14, 2020

Related U.S. Application Data

(60) Provisional application No. 62/758,470, filed on Nov. 9, 2018.

(51) Int. Cl.
 *B25J 9/16* (2006.01)
 *G05B 19/4097* (2006.01)

(52) U.S. Cl.
 CPC ............ *B25J 9/1658* (2013.01); *B25J 9/1664* (2013.01); *G05B 19/4097* (2013.01); *G05B 2219/35134* (2013.01); *G05B 2219/45064* (2013.01)

(58) Field of Classification Search
 CPC ...... G05B 19/4097; G05B 2219/35134; G05B 2219/35218; G05B 2219/45064; B25J 9/1664; B25J 9/1658; B25J 9/1687
 See application file for complete search history.

(56) References Cited

U.S. PATENT DOCUMENTS

| | | | |
|---|---|---|---|
| 4,730,870 A | * | 3/1988 | DeRees .............. B62D 63/025 296/192 |
| 2002/0056181 A1 | * | 5/2002 | Sakakibara ............ B25J 9/1633 29/714 |

(Continued)

OTHER PUBLICATIONS

Huang; "Collision-free path planning method with learning ability for space manipulator"; in Proceedings of the 2017 12th IEEE Conference on Industrial Electronics and Applications (ICIEA); pp. 1790-1795; Siem Reap, Cambodia; Jun. 2017 (Year: 2017).*

*Primary Examiner* — Stephen Holwerda
(74) *Attorney, Agent, or Firm* — Artegis Law Group, LLP

(57) ABSTRACT

An assembly engine is configured to generate, based on a computer-aided design (CAD) assembly, a set of motion commands that causes the robot to manufacture a physical assembly corresponding to the CAD assembly. The assembly engine analyzes the CAD assembly to determine an assembly sequence for various physical components to be included in the physical assembly. The assembly sequence indicates the order in which each physical component should be incorporated into the physical assembly and how those physical components should be physically coupled together. The assembly engine further analyzes the CAD assembly to determine different component paths that each physical component should follow when being incorporated into the physical assembly. Based on the assembly sequence and the component paths, the assembly engine generates a set of motion commands that the robot executes to assemble the physical components into the physical assembly.

20 Claims, 6 Drawing Sheets

(56) References Cited

U.S. PATENT DOCUMENTS

2006/0156978 A1\* 7/2006 Lipson ................... B33Y 50/00
 438/3
2008/0228450 A1\* 9/2008 Jakobsen ................ G06T 19/20
 703/2
2013/0111731 A1\* 5/2013 Onishi ................... B25J 9/1687
 29/700

\* cited by examiner

TECHNIQUES FOR CAD-INFORMED ROBOTIC ASSEMBLY

CROSS-REFERENCE TO RELATED APPLICATIONS

This application claims the priority benefit of U.S. provisional patent application titled, "Techniques for Informed Robotic Assembly," filed on Nov. 9, 2018 and having Ser. No. 62/758,470. The subject matter of this related application is hereby incorporated herein by reference.

BACKGROUND

Field of the Various Embodiments

Various embodiments relate generally to computer-aided design and robotic manufacturing and, more specifically, to techniques for informed robotic assembly.

DESCRIPTION OF THE RELATED ART

During the design phase of a typical design and manufacturing workflow, a designer can use a computer-aided design (CAD) application to design a set of three-dimensional (3D) CAD components. A given 3D CAD component includes 3D geometry that describes a physical 3D shape. The designer then uses the CAD application to combine the set of CAD components into a CAD assembly. A given CAD assembly indicates the position and orientation of each CAD component relative to one another and describes how those CAD components are coupled together via one or more constraints.

During the manufacturing phase of a typical design and manufacturing workflow, an engineer usually has to manually program a robot to manufacture a physical assembly corresponding to the CAD assembly. In this regard, the engineer has to analyze the CAD assembly to map the individual CAD components to corresponding physical components. The engineer then has to determine, based on the structure of the CAD assembly, how those physical components should be arranged relative to one another and physically coupled together via one or more constraints. Finally, the engineer has to manually generate a set of robot commands that cause the robot to obtain the relevant physical components, position the physical components relative to one another, and join those physical components together to form the physical assembly.

One drawback of the above approach is that manually generating a set of robot commands for manufacturing a physical assembly is a complex and tedious process. In practice, the engineer oftentimes has to manually input a series of commands to the robot using a joystick or other control mechanism. Consequently, the engineer usually has to expend significant time and energy to generate the set of robot commands, especially when dealing with complex physical assemblies. Another drawback of the above approach is that a given set of manually-generated robot commands can normally be applied only in the specific environment in which the robot commands were originally recorded. Notably, the commands cannot be used in programming other robots, even when those other robots are being programmed to perform similar functions or operations. Thus, different robots residing in different environments typically have to be programmed on an individual, case-by-case basis. Additionally, any changes to the original design necessitate manually updating the robot code via the same, tedious process.

As the foregoing illustrates, what is needed in the art are more effective techniques for programming robots to manufacture physical assemblies.

SUMMARY

Various embodiments include a computer-implemented method for constructing physical assemblies based on computer-aided design (CAD) assemblies, including generating an assembly sequence based on a CAD assembly, wherein the assembly sequence indicates an order for incorporating different physical components into a physical assembly, generating a set of component paths based on the CAD assembly and the assembly sequence, wherein each component path included in the set of component paths indicates a sequence of robot positions to traverse in order to incorporate a given physical component into the physical assembly, and generating a set of motion commands based on the assembly sequence and the set of component paths, wherein the set of motion commands is executed by a robot to construct the physical assembly.

At least one technical advantage of the disclosed techniques relative to the prior art is that the disclosed techniques enable robots to be configured to manufacture physical assemblies corresponding to various CAD assemblies with minimal manual programming.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
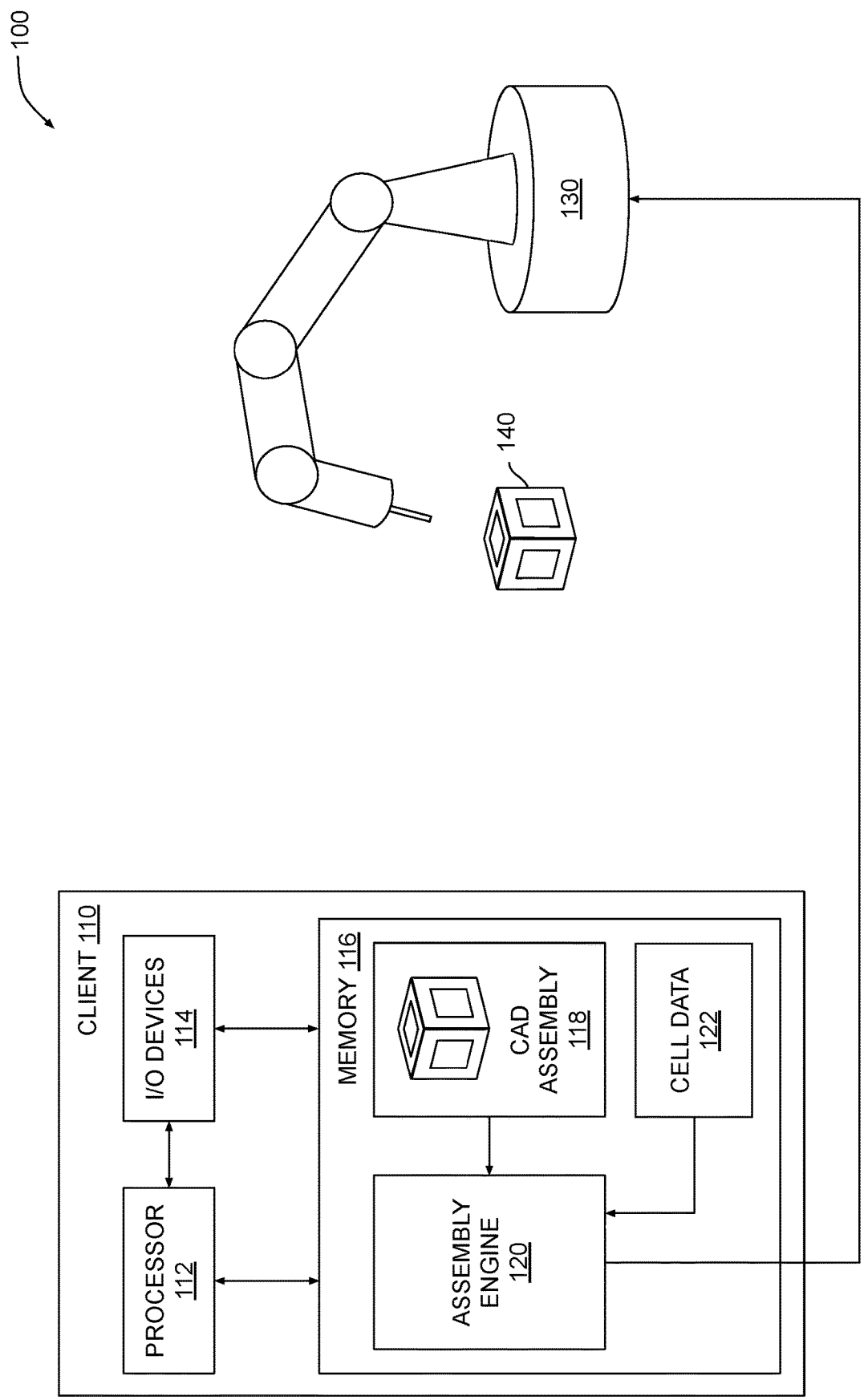
FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, during a manufacturing phase of a typical design and manufacturing workflow, an engineer manually performs various steps to program a robot to manufacture a physical assembly that corresponds to a given CAD assembly. In doing so, the engineer maps the individual CAD components to corresponding physical components, determines how those physical components should be arranged and coupled together, and then programs the robot with a set of motion commands that causes the robot to obtain, arrange, and couple together the various physical components.

However, manually programming a robot in the manner described above is a complex and tedious process that oftentimes involves the engineer manually inputting motion commands to the robot via an input device, such as a joystick. These manually-generated motion commands are typically applicable only to the specific environment where those motion commands are originally recorded and cannot easily be adapted to program other robots that reside in different environments to perform similar operations.

To address these issues, various embodiments include an assembly engine that is configured to generate, based on a CAD assembly, a set of motion commands that causes the robot to manufacture a physical assembly corresponding to the CAD assembly. The assembly engine analyzes the CAD assembly to determine an assembly sequence for various physical components to be included in the physical assembly. The assembly sequence indicates the order in which each of those physical components should be incorporated into the physical assembly and how those physical components should be physically coupled together. The assembly engine further analyzes the CAD assembly to determine different component paths that each physical component should follow when being incorporated into the physical assembly. Based on the assembly sequence and the component paths, the assembly engine generates a set of motion commands that the robot executes to assemble the physical components into the physical assembly.

At least one technical advantage of the disclosed techniques relative to the prior art is that the disclosed techniques enable robots to be configured to manufacture physical assemblies corresponding to various CAD assemblies with minimal manual programming. Accordingly, with the disclosed techniques, engineers no longer have to expend significant amounts of time programming robots and manually inputting motion commands to robots via input devices, as is required with conventional techniques. In addition, the disclosed techniques establish a parametric relationship between a CAD design and a corresponding robot program; such that, if the CAD design is changed or updated, the corresponding robot program can be automatically updated. Further, because the disclosed techniques can be performed automatically, different robots that reside in different environments can be programmed to perform similar assembly operations without requiring an engineer to program each such robot separately. These technical advantages represent one or more technological advancements over prior art approaches.

System Overview

FIG. 1 illustrates a system 100 configured to perform one or more aspects of the present embodiments. As shown, system 100 includes a computing device 110 coupled to a robot 130 that is configured to manufacture a physical assembly 140. Computing device 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes a CAD assembly 118, an assembly engine 120, and cell data 122. CAD assembly 118 includes 3D geometry associated with a set of CAD components and relationship data indicating how those CAD components are coupled together. Cell data 122 defines the physical attributes of a robot cell where robot 130 operates and defines the manufacturing capabilities of robot 130, including available end-effectors, operations, and so forth. Assembly engine 120 is a software application that, when executed by processor 112, configures processor 112 to analyze CAD assembly 118 and generate motion commands that cause robot 130 to generate physical assembly 140 based on CAD assembly 118. Physical assembly 140 is a physical representation of CAD assembly 118. The operation of assembly engine 120 is described in greater detail below in conjunction with FIGS. 2-6.

Software Overview

Figure 2:
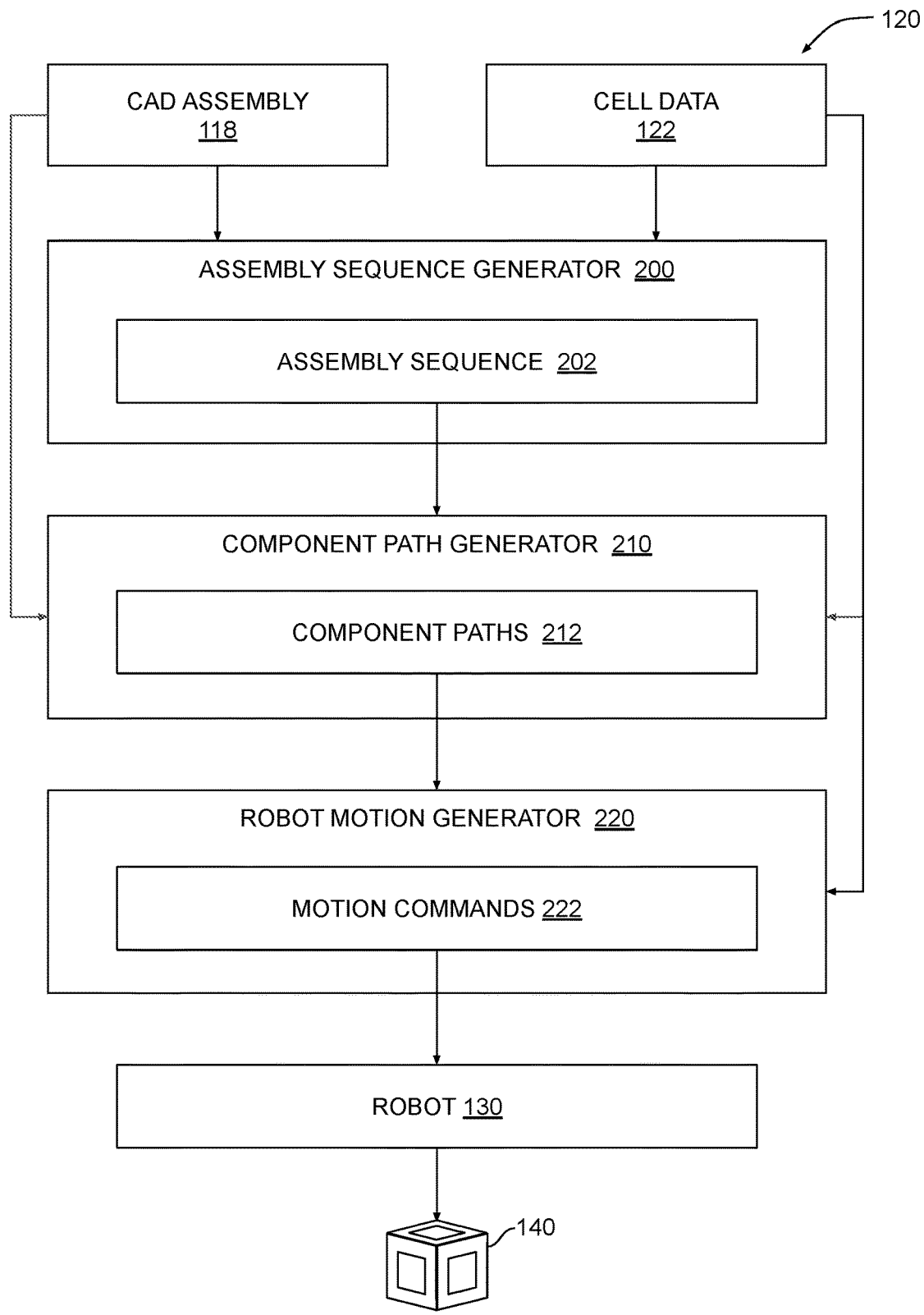
FIG. 2 is a more detailed illustration of the assembly engine of FIG. 1, according to various embodiments.

FIG. 2 is a more detailed illustration of the assembly engine of FIG. 1, according to various embodiments. As shown, assembly engine 120 includes an assembly sequence generator 200, a component path generator 210, and a robot motion generator 220.

In operation, assembly sequence generator 200 analyzes CAD assembly 118 and cell data 122 to generate assembly sequence 202. Assembly sequence 202 indicates the order with which robot 130 should assemble a set of physical components corresponding to the CAD components included in CAD assembly 118 to generate physical assembly 140. Assembly sequence 202 also indicates specific operations that robot 130 should perform in order to couple those physical components together in a manner that is consistent with the relationship data set forth in CAD assembly 118.

For example, assembly sequence 202 could indicate that robot 130 should initially select a first physical component for incorporation into CAD assembly 140 and subsequently select a second physical component for incorporation into CAD assembly 140. Assembly sequence 202 could further indicate that robot 130 should weld an edge of the first physical component to an edge of the second physical component to form a subassembly within physical assembly 140.

Assembly sequence generator 200 processes cell data 122 when generating assembly sequence 202 to account for the manufacturing capabilities of robot 130 as well as to respect any physical constraints associated with the environment where robot 130 operates and/or any physical constraints associated with physical assembly 140. An example of how assembly generator 200 generates assembly sequence 202 is described in greater detail below in conjunction with FIG. 3.

Component path generator 210 analyzes CAD assembly 118, cell data 122, and assembly sequence 202 to generate component paths 212. Component paths 212 indicate specific paths along which robot 130 should move each physical component during incorporation into physical assembly 140 to avoid collisions with existing portions of physical assembly 140.

For example, a given component path 212 associated with a given physical component could include a set of 3D translations and 3D rotations for incorporating the given physical component into the physical assembly 140 in a manner that circumvents another physical component that is already incorporated into physical assembly 140. During construction of physical assembly 140, robot 130 would manipulate the given physical component based on those 3D translations and 3D rotations to position the physical component correctly relative to physical assembly 140 and relative to other physical components already included in physical assembly 140.

Component path generator 210 simulates the current state of physical assembly 140 during different stages of assembly in order to generate component paths that do not intersect or collide with physical components that have already been incorporated into physical assembly 140. Similar to assembly sequence generator 200, component path generator 210 also processes cell data 122 when generating component paths 212 to account for the manufacturing capabilities of robot 130 and to respect any physical constraints associated with the environment where robot 130 operates. An example of how component path generator 210 generates component paths 212 is described in greater detail below in conjunction with FIG. 4.

Robot motion generator 220 analyzes component paths 212 to generate motion commands 222. Motion commands 222 describe motions that robot 130 should execute to incorporate physical components into physical assembly 140 via the paths described in component paths 210 and with the ordering and coupling described in assembly sequence 202.

Motion commands 222 may include lower-level commands such as joint articulation angles or angular rates, and/or armature extension levels or extension rates, as well as higher-level commands such as end-effector selections and/or fixture selections that can be implemented via one or more preset sequences of lower-level commands.

In one embodiment, motion commands 222 may include computer numerical control (CNC) code, such as G-Code, for controlling robot 130 during construction of physical assembly 140. Once robot motion generator 220 generates motion commands 222, robot 130 can execute those commands to manufacture physical assembly 140 to represent CAD assembly 118. An example of how robot motion generator 220 generates motion commands 222 is described in greater detail below in conjunction with FIG. 5.

Exemplary Manufacturing of a Physical Assembly

Figure 3:
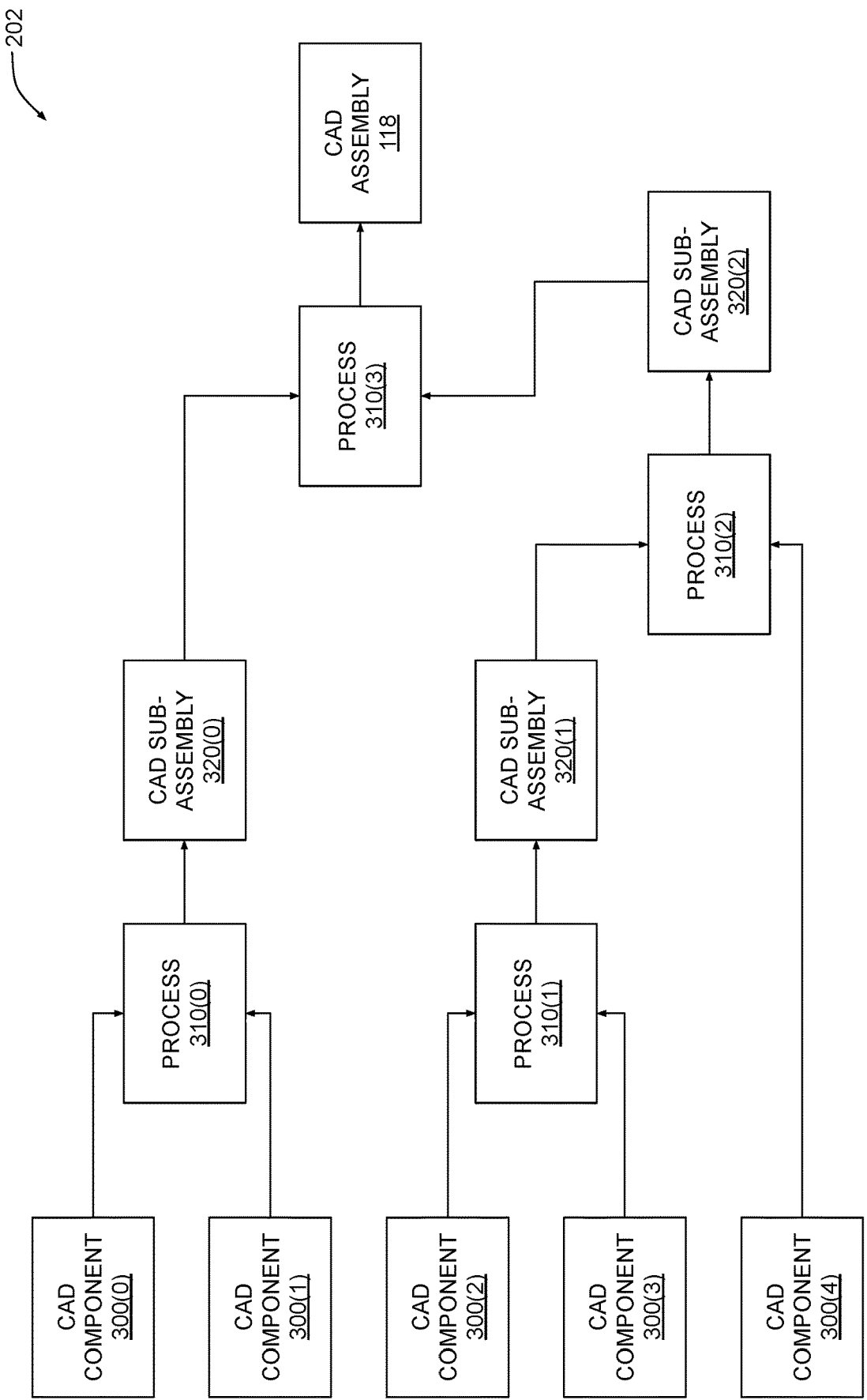
FIG. 3 is an example of the assembly sequence of FIG. 2, according to various embodiments.

FIG. 3 is an example of the assembly sequence of FIG. 2, according to various embodiments. As shown, assembly sequence 202 includes a set of CAD components 300, a set of processes 310, a set of CAD sub-assemblies 320, and CAD assembly 118. CAD components 300 include 3D geometry that represents a part or a portion of material within CAD assembly 118. For example, a given CAD component 300 could include a triangulated mesh that represents a gear included in a gearbox. Processes 310 represent physical operations via which CAD components 300 can be coupled together to form CAD sub-assemblies. For example, a given process 310 could describe a linear weld used to join together two sheets of metal. Processes 310 can also represent physical operations via which CAD sub-assemblies 320 are coupled together or coupled with CAD components 300 to form larger CAD sub-assemblies 320.

In one embodiment, assembly sequence generator 200 may generate assembly sequence 202 by dividing CAD assembly 118 into a set of larger sub-assemblies 320 that are coupled together via one or more joints and then determining one or more processes 310 corresponding to those joints. Assembly sequence generator 200 may then repeat this process by dividing each CAD sub-assembly 320 into smaller CAD sub-assemblies 320 and/or smaller CAD components 300 coupled together via one or more joints and then determining one or more processes 310 corresponding to those joints. In this manner, assembly sequence generator 200 can recursively disassemble CAD assembly 118 until a set of CAD components 300 remain. Assembly sequence generator 200 then generates assembly sequence 202 by reversing the order with which the recursive disassembly process is performed. In one embodiment, assembly sequence 202 is a Petri Net, place/transition (PT) net, or variation thereof, that may be generated using techniques known to those skilled in the art.

Once assembly sequence generator 200 generates assembly sequence 202 in the manner described, component path generator 210 processes assembly sequence 202 in conjunction with CAD assembly 118 and cell data 122 to generate component paths 212, as described in greater detail below in conjunction with FIG. 4.

Figure 4:
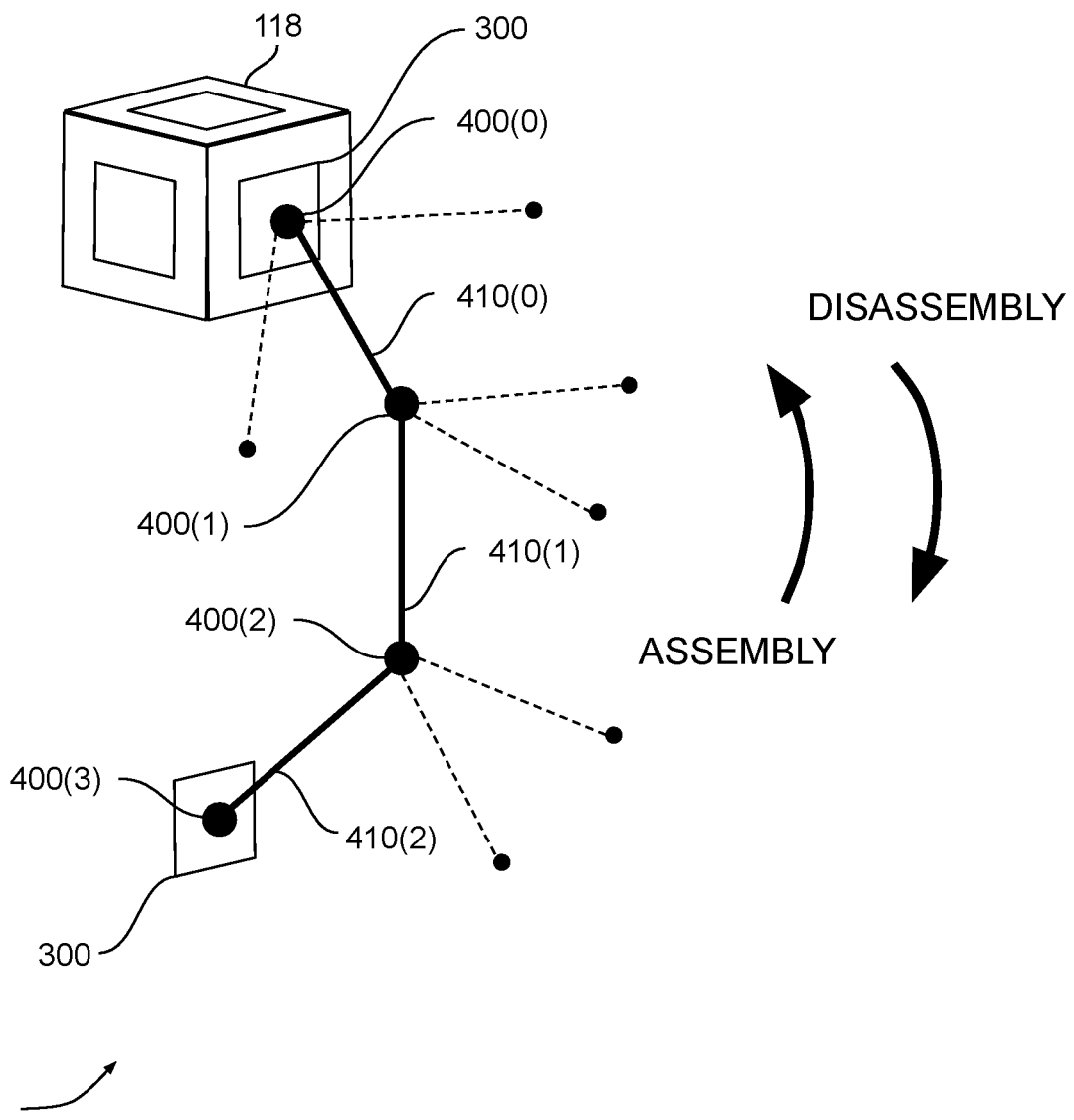
FIG. 4 is an example of the component paths of FIG. 2, according to various embodiments.

FIG. 4 is an example of the component paths of FIG. 2, according to various embodiments. As shown, component path 212 generally indicates a path that a given CAD component 300 can traverse during assembly or disassembly of CAD assembly 118. "Assembly" generally occurs when the given CAD component 300 is added to CAD assembly 118. Conversely, "disassembly" generally occurs when CAD component 300 is removed from CAD assembly 118. Component path 212 includes a set of component positions 400 coupled together via a set of path segments 410. A given component position 400 is a 3D location that a particular CAD component 300 may occupy during assembly or disassembly of CAD assembly 118. A given path segment 410 is a 3D vector that couples together two component positions 400 and indicates a trajectory that the CAD component 300 may traverse during assembly or disassembly of CAD assembly 118.

Component path generator 210 generates component path 212 when disassembling CAD assembly 118 based on assembly sequence 202. In particular, assembly sequence generator 210 iteratively removes CAD sub-assemblies 320 and/or CAD components 300 from CAD assembly 118 based on the reverse ordering set forth in assembly sequence 302. In the example shown, component path generator 210 disassembles CAD assembly 118 by first removing CAD component 300 from CAD assembly 118 along component path 212.

Component path generator 210 generates component path 212 for CAD component 300 by incrementally moving CAD component 300 from an initial component position 400(0) along alternate path segments (shown dashed) and then selecting a particular path segment 410(0) that (i) avoids collisions with other portions of CAD assembly 118 and/or robot 130 and (ii) moves CAD component 300 away from CAD assembly 118 and/or towards a target destination. Component path generator 210 repeats the process of incrementally moving CAD component 300 for each component position 400 until CAD component 300 reaches the target destination. During the above process, component path generator 210 can, at any given component position 400, apply one or more rotations to CAD component 300 in addition to, or instead of, moving CAD component 300. In one embodiment, component path generator 210 may implement an A-star search algorithm to generate component paths 212.

Once assembly component path generator 210 generates assembly sequence 202 in the manner described, robot motion generator 220 converts component paths 212 into motion commands 222, as described in greater detail below in conjunction with FIG. 5.

Figure 5:
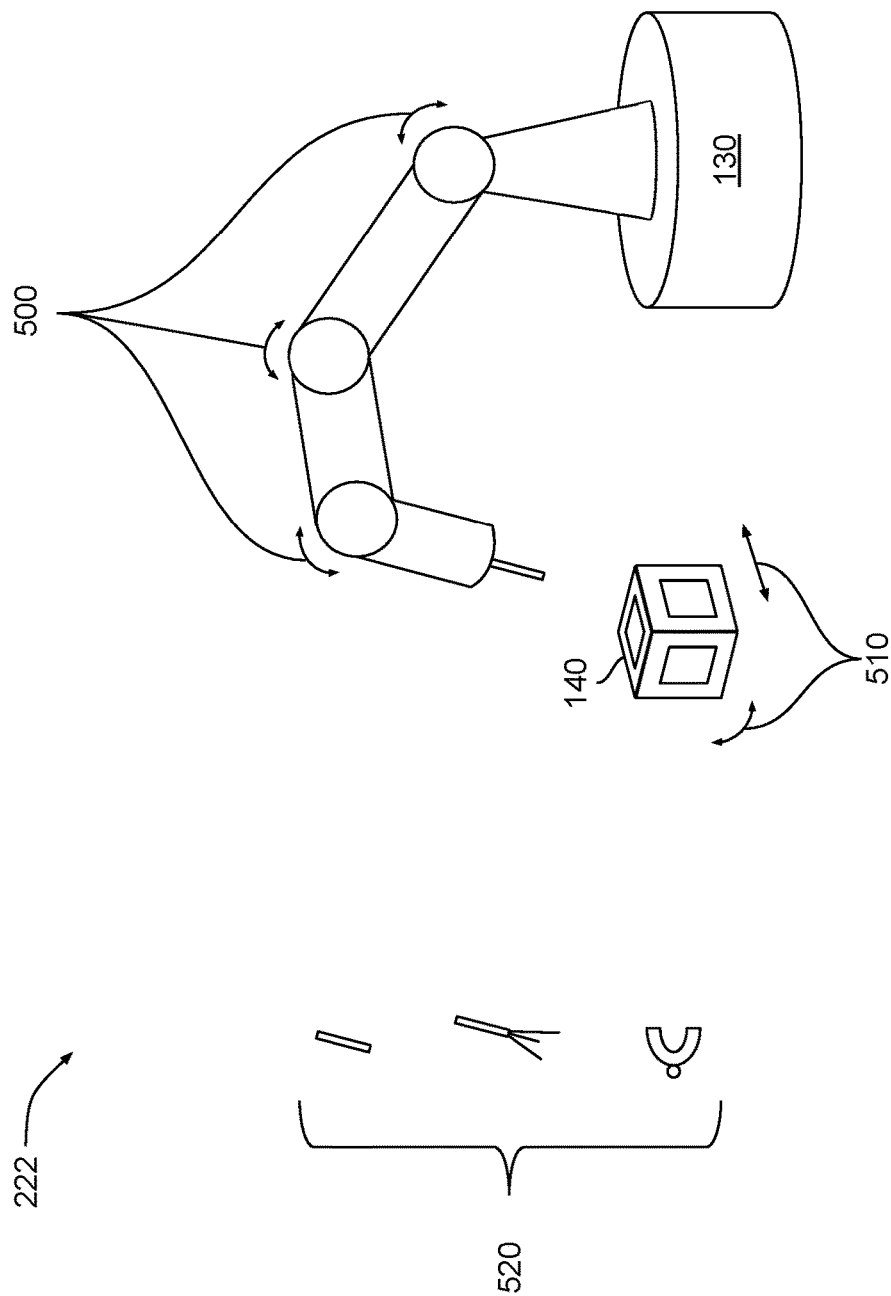
FIG. 5 is an example of the robot commands of FIG. 2, according to various embodiments.

FIG. 5 is an example of the motion commands of FIG. 2, according to various embodiments. As shown, motion commands 222 may include rotation commands 500 for actuating one or more joints of robot 130, rotation and/or translation commands 510 for moving physical assembly 140 during construction, and end-effector selections 520 for changing the end-effector with which robot 130 constructs physical assembly 140. Robot motion generator 220 generates motion commands 222 by translating the 3D trajectories and/or 3D rotations set forth in component paths 212 into a CNC representation. In one embodiment, robot motion generator 220 may implement a G-code generator to generate motion commands 222 based on component paths 212. In another embodiment, robot 130 may include one or more optical sensors and may implement computer vision techniques to identify and obtain physical components when executing motion commands 222.

Referring generally to FIGS. 3-5, persons skilled in the art will understand that the exemplary data and operations discussed above are provided for illustrative purposes. Assembly engine 120 can perform the essential operations discussed above in conjunction with FIGS. 1-2 under a wide variety of operational circumstances outside of those discussed by way of example in conjunction with FIGS. 3-5. In one embodiment, the techniques described thus far may be applied to configure multiple robots to perform a similar set of assembly tasks or a related set of assembly tasks. In another embodiment, the techniques described thus far may be applied to configure multiple robots to perform different portions of a particular assembly task. The disclosed techniques are described in greater detail below in conjunction with FIG. 6.

Automatically Programming a Robot to Manufacture a Physical Assembly

Figure 6:
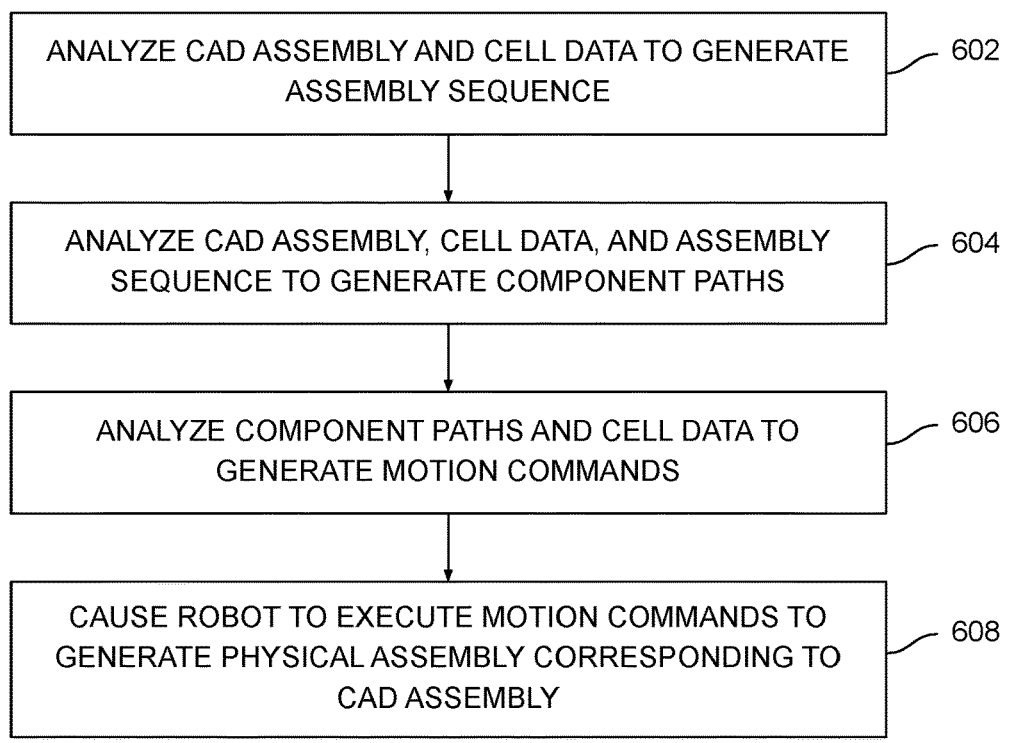
FIG. 6 is a flow diagram of method steps for automatically programming a robot to manufacture an assembly, according to various embodiments.

FIG. 6 is a flow diagram of method steps for automatically programming a robot to manufacture an assembly, according to various embodiments. Although the method steps are described in conjunction with the systems of FIGS. 1-5, persons skilled in the art will understand that any system configured to perform the method steps in any order falls within the scope of the various embodiments.

As shown, a method 600 begins at step 602, where assembly sequence generator 200 within assembly engine 120 analyzes CAD assembly 118 and cell data 122 to generate assembly sequence 202 shown in FIG. 2. Assembly sequence 202 indicates the order with which robot 130 should assemble a set of physical components to generate physical assembly 140. Those physical components correspond to the CAD components included in CAD assembly 118. Assembly sequence 202 also indicates specific operations that robot 130 should perform in order to physically couple those physical components together. Assembly sequence generator 200 also processes cell data 122 when performing step 602 to account for the manufacturing capabilities of robot 130 and to respect any physical constraints associated with the environment where robot 130 operates.

At step 604, component path generator 210 within assembly engine 120 analyzes CAD assembly 118, cell data 122, and assembly sequence 202 generated at step 602 to generate component paths 212 shown in FIG. 2. Component paths 212 indicate specific paths along which robot 130 should move each physical component during incorporation into physical assembly 140. A given component path may indicate one or more 3D translations and/or one or more 3D rotations that robot 130 should apply during manipulation of a corresponding physical component. When performing step 604, component path generator 210 simulates the current state of physical assembly 140 during different stages of assembly to avoid generating component paths that intersect or collide with physical components that have already been incorporated into physical assembly 140. Component path generator 210 also processes cell data 122 when generating component paths 212 to account for the manufacturing capabilities of robot 130 and to respect any physical constraints associated with the environment where robot 130 operates.

At step 606, robot motion generator 220 within assembly engine 120 analyzes component paths 210 generated at step 604 along with cell data 122 to generate motion commands 222 of FIG. 2. Motion commands 222 describe motions that robot 130 should execute to incorporate physical components into physical assembly 140 via the paths described in component paths 210 and with the ordering and coupling described in assembly sequence 202. Motion commands 222 may include lower-level commands such as joint articulation angles or angular rates, and/or armature extension levels or extension rates, as well as higher-level commands such as end-effector selections and/or fixture selections. Motion commands 222 could include, for example, CNC code such as G-Code, among other types of control code.

At step 608, assembly engine 120 causes robot 130 to execute motion commands 222 generated at step 606 to generate physical assembly 140 corresponding to CAD assembly 130. In the manner described, assembly engine 120 can automatically generate physical assembly 140 via robot 130 without manually-generated programming input describing the specific motions that robot 130 should perform, as needed with conventional techniques.

In sum, various embodiments include an assembly engine that is configured to generate, based on a CAD assembly, a set of motion commands that causes the robot to manufacture a physical assembly corresponding to the CAD assembly. The assembly engine analyzes the CAD assembly to determine an assembly sequence for various physical components to be included in the physical assembly. The assembly sequence indicates the order in which each physical component should be incorporated into the physical assembly and how those physical components should be physically coupled together. The assembly engine further analyzes the CAD assembly to determine different component paths that each physical component should follow when being incorporated into the physical assembly. Based on the assembly sequence and the component paths, the assembly engine generates a set of motion commands that the robot executes to assemble the physical components into the physical assembly.

At least one technical advantage of the disclosed techniques relative to the prior art is that the disclosed techniques enable robots to be configured to manufacture physical assemblies corresponding to various CAD assemblies with minimal manual programming. Accordingly, with the disclosed techniques, engineers no longer have to expend significant amounts of time programming robots and manually inputting motion commands to robots via input devices, as is required with conventional techniques. In addition, the disclosed techniques establish a parametric relationship between a CAD design and a corresponding robot program; such that, if the CAD design is changed or updated, the corresponding robot program can be automatically updated. Further, because the disclosed techniques can be performed automatically, different robots that reside in different environments can be programmed to perform similar assembly operations without requiring an engineer to program each such robot separately. These technical advantages represent one or more technological advancements over prior art approaches.

1. Some embodiments include a computer-implemented method for constructing physical assemblies based on computer-aided design (CAD) assemblies, the method comprising generating an assembly sequence based on a CAD assembly, wherein the assembly sequence indicates an order for incorporating different physical components into a physical assembly, generating a set of component paths based on the CAD assembly and the assembly sequence, wherein each component path included in the set of component paths indicates a sequence of robot positions to traverse in order to incorporate a given physical component into the physical assembly, and generating a set of motion commands based on the assembly sequence and the set of component paths, wherein the set of motion commands is executed by a robot to construct the physical assembly.

2. The computer-implemented method of clause 1, wherein generating the assembly sequence comprises performing an initial disassembly operation to remove an initial set of CAD components from the CAD assembly, performing a final disassembly operation to remove a final set of CAD components from the CAD assembly, and generating the assembly sequence to include an initial assembly operation that corresponds to the final disassembly operation and a final assembly operation that corresponds to the initial disassembly operation.

3. The computer-implemented method of any of clauses 1-2, wherein generating the assembly sequence comprises generating a place/transition network that includes a first node corresponding to a first CAD component, a second node corresponding to a second CAD component, and a third node corresponding to a process for combining the first CAD component and the second CAD component to generate a first CAD sub-assembly included in the CAD assembly.

4. The computer-implemented method of any of clauses 1-3, wherein generating the set of component paths comprises determining, for at least one CAD component included in the CAD assembly, at least one path segment that the at least one CAD component traverses when moving towards a target destination, wherein, when traversing the at least one path segment, the at least one CAD component does not intersect any other CAD components included in the CAD assembly.

5. The computer-implemented method of any of clauses 1-4, wherein generating the set of component paths comprises executing, for at least one CAD component included in the CAD assembly, an A-star search algorithm to determine at least one path segment that the at least one CAD component traverses when moving towards a target destination, wherein, when traversing the at least one path segment, the at least one CAD component does not intersect any other CAD components included in the CAD assembly.

6. The computer-implemented method of any of clauses 1-5, wherein generating the set of motion commands comprises translating the set of component paths into at least one of a joint angle associated with the robot, a position associated with the physical assembly, an orientation associated with the physical assembly, and a selection of end-effector for the robot.

7. The computer-implemented method of any of clauses 1-6, wherein generating the set of motion commands comprises generating a computational numerical code that causes the robot to move an end-effector along at least one component path included in the set of component paths.

8. The computer-implemented method of any of clauses 1-7, further comprising determining a first physical component that corresponds to a first CAD component included in the CAD assembly, and causing, through execution of at least one motion command included in the set of motion commands, the robot to obtain the first physical component from within a robot cell where the robot resides.

9. The computer-implemented method of any of clauses 1-8, wherein the assembly sequence, the component paths, and the motion commands are based, at least in part, on cell data that defines one or more physical attributes of an environment where the robot resides.

10. The computer-implemented method of any of clauses 1-9, wherein the physical assembly includes a first physical sub-assembly that has been constructed by a first robot and a second physical sub-assembly that has been constructed by a second robot, wherein the robot executes at least one motion command included in the set of motion commands to couple the first physical sub-assembly to the second physical sub-assembly.

11. Some embodiments include a non-transitory computer-readable medium storing program instructions that, when executed by a processor, cause the processor to construct physical assemblies based on computer-aided design (CAD) assemblies generating an assembly sequence based on a CAD assembly, wherein the assembly sequence indicates an order for incorporating different physical components into a physical assembly, generating a set of component paths based on the CAD assembly and the assembly sequence, wherein each component path included in the set of component paths indicates a sequence of robot positions to traverse in order to incorporate a given physical component into the physical assembly, and generating a set of motion commands based on the assembly sequence and the set of component paths, wherein the set of motion commands is executed by a robot to construct the physical assembly.

12. The non-transitory computer-readable medium of clause 11, wherein the step of generating the assembly sequence comprises performing an initial disassembly operation to remove an initial set of CAD components from the CAD assembly, performing a final disassembly operation to remove a final set of CAD components from the CAD assembly, and generating the assembly sequence to include an initial assembly operation that corresponds to the final disassembly operation and a final assembly operation that corresponds to the initial disassembly operation.

13. The non-transitory computer-readable medium of any of clauses 11-12, wherein the step of generating the assembly sequence comprises generating a place/transition network that includes a first node corresponding to a first CAD component, a second node corresponding to a second CAD component, and a third node corresponding to a process for combining the first CAD component and the second CAD component to generate a first CAD sub-assembly included in the CAD assembly.

14. The non-transitory computer-readable medium of any of clauses 11-13, wherein the step of generating the set of component paths comprises determining, for at least one CAD component included in the CAD assembly, at least one path segment that the at least one CAD component traverses when moving towards a target destination, wherein, when traversing the at least one path segment, the at least one CAD component does not intersect any other CAD components included in the CAD assembly.

15. The non-transitory computer-readable medium of any of clauses 11-14, wherein the step of generating the set of motion commands comprises translating the set of component paths into at least one of a joint angle associated with the robot, a position associated with the physical assembly, an orientation associated with the physical assembly, and a selection of end-effector for the robot.

16. The non-transitory computer-readable medium of any of clauses 11-15, further comprising the steps of determining a first physical component that corresponds to a first CAD component included in the CAD assembly, and causing, through execution of at least one motion command included in the set of motion commands, the robot to obtain the first physical component from within a robot cell where the robot resides.

17. The non-transitory computer-readable medium of any of clauses 11-16, wherein the physical assembly includes a first physical sub-assembly that has been constructed by the robot and a second physical sub-assembly that has been constructed by the robot, wherein the robot executes at least one motion command included in the set of motion commands to couple the first physical sub-assembly to the second physical sub-assembly.

18. The non-transitory computer-readable medium of any of clauses 11-17, wherein the robot constructs the physical assembly by physically connecting a first physical component to a first physical subassembly included in the physical assembly.

19. The non-transitory computer-readable medium of any of clauses 11-18, wherein the robot constructs the physical assembly by physically connecting a first physical component to a second physical component while avoiding a collision with a third physical component that has already been incorporated into the physical assembly.

20. Some embodiments include a system, comprising a memory storing a software application, and a processor that, when executing the software application, is configured to perform the steps of generating an assembly sequence based on a CAD assembly, wherein the assembly sequence indicates an order for incorporating different physical components into a physical assembly, generating a set of component paths based on the CAD assembly and the assembly sequence, wherein each component path included in the set of component paths indicates a sequence of robot positions to traverse in order to incorporate a given physical component into the physical assembly, and generating a set of motion commands based on the assembly sequence and the set of component paths, wherein the set of motion commands is executed by a robot to construct the physical assembly.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for constructing physical assemblies based on computer-aided design (CAD) assemblies, the method comprising:
    performing a recursive disassembly of a CAD assembly to generate a set of sub-assemblies from the CAD assembly and one or more physical processes for coupling the sub-assemblies together via one or more joints, and to generate a plurality of CAD components from the set of sub-assemblies and one or more physical processes for coupling the CAD components included in the plurality of CAD components together via one or more joints;
    generating an assembly sequence based on the recursive disassembly of the CAD assembly, wherein the assembly sequence indicates an order for incorporating different physical components corresponding to the plurality of CAD components into a physical assembly and further specifies the one or more physical processes for coupling the different physical components together via the one or more joints;
    generating a set of component paths based on the CAD assembly and the assembly sequence, wherein each component path included in the set of component paths indicates a sequence of robot positions to traverse in order to incorporate a given physical component into the physical assembly; and
    generating a set of motion commands based on the assembly sequence and the set of component paths, wherein the set of motion commands is executed by a robot to construct the physical assembly, wherein the set of motion commands includes a plurality of lower-level commands associated with at least one of joint articulation angles or angular rates, and a plurality of higher-level commands that are implemented via one or more preset sequences of lower-level commands, and a first higher-level command included in the set of motion commands specifies switching an end-effector with which a first portion of the robot constructs the physical assembly from a first end-effector to a second end-effector.

2. The computer-implemented method of claim 1, wherein generating the assembly sequence comprises:
    performing an initial disassembly operation to remove an initial set of CAD components from the CAD assembly;
    performing a final disassembly operation to remove a final set of CAD components from the CAD assembly; and
    generating the assembly sequence to include an initial assembly operation that corresponds to a reverse of the final disassembly operation and a final assembly operation that corresponds to a reverse of the initial disassembly operation.

3. The computer-implemented method of claim 1, wherein generating the assembly sequence comprises generating a place/transition network that includes a first node corresponding to a first CAD component, a second node corresponding to a second CAD component, and a third node corresponding to a process for combining the first CAD component and the second CAD component to generate a first CAD sub-assembly included in the CAD assembly.

4. The computer-implemented method of claim 1, wherein generating the set of component paths comprises determining, for at least one CAD component included in the CAD assembly, at least one path segment that the at least one CAD component traverses when moving towards a target destination, wherein, when traversing the at least one path segment, the at least one CAD component does not intersect any other CAD components included in the CAD assembly.

5. The computer-implemented method of claim 1, wherein generating the set of component paths comprises executing, for at least one CAD component included in the CAD assembly, an A-star search algorithm to determine at least one path segment that the at least one CAD component traverses when moving towards a target destination, wherein, when traversing the at least one path segment, the at least one CAD component does not intersect any other CAD components included in the CAD assembly.

6. The computer-implemented method of claim 1, wherein generating the set of motion commands comprises translating the set of component paths into at least one of a joint angle associated with the robot, a position associated with the physical assembly, an orientation associated with the physical assembly, and a selection of one or more end-effectors for the robot.

7. The computer-implemented method of claim 1, wherein generating the set of motion commands comprises generating a computational numerical code that causes the robot to move one or more end-effectors along at least one component path included in the set of component paths.

8. The computer-implemented method of claim 1, further comprising:
    determining a first physical component that corresponds to a first CAD component included in the CAD assembly; and
    causing, through execution of at least one motion command included in the set of motion commands, the robot to obtain the first physical component from within a robot cell where the robot resides.

9. The computer-implemented method of claim 1, wherein the assembly sequence, the component paths, and the motion commands are based, at least in part, on cell data that defines one or more physical attributes of an environment where the robot resides.

10. The computer-implemented method of claim 1, wherein the physical assembly includes a first physical sub-assembly that has been constructed by a first robot and a second physical sub-assembly that has been constructed by a second robot, wherein the robot executes at least one motion command included in the set of motion commands to couple the first physical sub-assembly to the second physical sub-assembly.

11. One or more non-transitory computer-readable media storing program instructions that, when executed by one or more processors, cause the one or more processors to construct physical assemblies based on computer-aided design (CAD) assemblies by:
    performing a recursive disassembly of a CAD assembly to generate a set of sub-assemblies from the CAD assembly and one or more physical processes for coupling the sub-assemblies together via one or more joints, and to generate a plurality of CAD components from the set of sub-assemblies and one or more physical processes for coupling the CAD components included in the plurality of CAD components together via one or more joints;

generating an assembly sequence based on the recursive disassembly of the CAD assembly, wherein the assembly sequence indicates an order for incorporating different physical components corresponding to the plurality of CAD components into a physical assembly and further specifies the one or more physical processes for coupling the different physical components together via the one or more joints;

generating a set of component paths based on the CAD assembly and the assembly sequence, wherein each component path included in the set of component paths indicates a sequence of robot positions to traverse in order to incorporate a given physical component into the physical assembly; and generating a set of motion commands based on the assembly sequence and the set of component paths, wherein the set of motion commands is executed by a robot to construct the physical assembly, wherein the set of motion commands includes a plurality of lower-level commands associated with at least one of joint articulation angles or angular rates, and a plurality of higher-level commands that are implemented via one or more preset sequences of lower-level commands, and a first higher-level command included in the set of motion commands specifies switching an end-effector with which a first portion of the robot constructs the physical assembly from a first end-effector to a second end-effector.

12. The one or more non-transitory computer-readable media of claim 11, wherein generating the assembly sequence comprises:
performing an initial disassembly operation to remove an initial set of CAD components from the CAD assembly;
performing a final disassembly operation to remove a final set of CAD components from the CAD assembly; and
generating the assembly sequence to include an initial assembly operation that corresponds to a reverse of the final disassembly operation and a final assembly operation that corresponds to a reverse of the initial disassembly operation.

13. The one or more non-transitory computer-readable media of claim 11, wherein generating the assembly sequence comprises generating a place/transition network that includes a first node corresponding to a first CAD component, a second node corresponding to a second CAD component, and a third node corresponding to a process for combining the first CAD component and the second CAD component to generate a first CAD sub-assembly included in the CAD assembly.

14. The one or more non-transitory computer-readable media of claim 11, wherein generating the set of component paths comprises determining, for at least one CAD component included in the CAD assembly, at least one path segment that the at least one CAD component traverses when moving towards a target destination, wherein, when traversing the at least one path segment, the at least one CAD component does not intersect any other CAD components included in the CAD assembly.

15. The one or more non-transitory computer-readable media of claim 11, wherein generating the set of motion commands comprises translating the set of component paths into at least one of a joint angle associated with the robot, a position associated with the physical assembly, an orientation associated with the physical assembly, and a selection of one or more end-effectors for the robot.

16. The one or more non-transitory computer-readable media of claim 11, wherein the program instructions further cause the processor to:
determine a first physical component that corresponds to a first CAD component included in the CAD assembly; and
cause, through execution of at least one motion command included in the set of motion commands, the robot to obtain the first physical component from within a robot cell where the robot resides.

17. The one or more non-transitory computer-readable media of claim 11, wherein the physical assembly includes a first physical sub-assembly that has been constructed by the robot and a second physical sub-assembly that has been constructed by the robot, wherein the robot executes at least one motion command included in the set of motion commands to couple the first physical sub-assembly to the second physical sub-assembly.

18. The one or more non-transitory computer-readable media of claim 11, wherein the robot constructs the physical assembly by welding a first physical component to a first physical subassembly included in the physical assembly using the first end-effector or the second end-effector.

19. The one or more non-transitory computer-readable media of claim 11, wherein the robot constructs the physical assembly by physically connecting a first physical component to a second physical component while avoiding a collision with a third physical component that has already been incorporated into the physical assembly.

20. A system, comprising:
one or more memories storing a software application; and
one or more processors that, when executing the software application, are configured to:
perform a recursive disassembly of a CAD assembly to generate a set of sub-assemblies from the CAD assembly and one or more physical processes for coupling the sub-assemblies together via one or more joints, and to generate a plurality of CAD components from the set of sub-assemblies and one or more physical processes for coupling the CAD components included in the plurality of CAD components together via one or more joints;
generate an assembly sequence based on the recursive disassembly of the CAD assembly, wherein the assembly sequence indicates an order for incorporating different physical components corresponding to the plurality of CAD components into a physical assembly and further specifies the one or more physical processes for coupling the different physical components together via the one or more joints,
generate a set of component paths based on the CAD assembly and the assembly sequence, wherein each component path included in the set of component paths indicates a sequence of robot positions to traverse in order to incorporate a given physical component into the physical assembly, and
generate a set of motion commands based on the assembly sequence and the set of component paths, wherein the set of motion commands is executed by a robot to construct the physical assembly, wherein the set of motion commands includes a plurality of lower-level commands associated with at least one of joint articulation angles or angular rates, and a plurality of higher-level commands that are implemented via one or more preset sequences of lower-level commands, and a first higher-level command included in the set of motion commands specifies switching an end-effector with which a first portion of the robot constructs the physical assembly from a first end-effector to a second end-effector.

* * * * *